United States Patent [19]

Knoblauch et al.

[11] Patent Number: 4,880,765
[45] Date of Patent: Nov. 14, 1989

[54] PROCESS FOR PRODUCING CARBON MOLECULAR SIEVES

[75] Inventors: Karl Knoblauch, Essen; Ferdinand Tarnow, Duisburg; Heinrich Heimbach, Essen, all of Fed. Rep. of Germany

[73] Assignee: Bergwerksverband GmbH, Essen, Fed. Rep. of Germany

[21] Appl. No.: 272,694

[22] PCT Filed: May 22, 1987

[86] PCT No.: PCT/EP87/00268
§ 371 Date: Nov. 3, 1988
§ 102(e) Date: Nov. 3, 1988

[87] PCT Pub. No.: WO87/07249
PCT Pub. Date: Dec. 3, 1987

[30] Foreign Application Priority Data

May 31, 1986 [DE] Fed. Rep. of Germany ....... 3618426

[51] Int. Cl.⁴ ................... C01B 31/10; C01B 31/08; B01J 20/20
[52] U.S. Cl. ........................... 502/432; 55/68; 55/75; 264/29.5; 423/445; 423/449; 502/420; 502/430; 502/431
[58] Field of Search ............... 502/432, 431, 430, 420; 423/445, 449; 264/29.5

[56] References Cited

U.S. PATENT DOCUMENTS

| | | | |
|---|---|---|---|
| 3,801,513 | 4/1974 | Munzner et al. | 502/432 |
| 3,960,522 | 6/1976 | Munzner et al. | 55/68 |
| 3,960,769 | 6/1976 | Munzner et al. | 502/417 |
| 3,979,330 | 9/1976 | Munzner et al. | 502/433 |
| 3,996,161 | 12/1976 | Chia | 502/417 |
| 4,015,956 | 4/1977 | Munzner et al. | 55/75 |
| 4,048,472 | 9/1977 | Sauer et al. | 34/147 |
| 4,083,810 | 4/1978 | Czerny et al. | 502/337 |
| 4,540,678 | 9/1985 | Sutt, Jr. | 502/432 |
| 4,594,163 | 6/1986 | Sutt, Jr. | 502/416 |
| 4,615,993 | 10/1986 | Schirrmacher et al. | 502/435 |

FOREIGN PATENT DOCUMENTS

| | | |
|---|---|---|
| 0077462 | 4/1983 | European Pat. Off. |
| 0102902 | 3/1984 | European Pat. Off. |
| 0146909 | 7/1985 | European Pat. Off. |
| 2119829 | 6/1977 | Fed. Rep. of Germany |
| 3618426 | 7/1987 | Fed. Rep. of Germany |
| 2258895 | 8/1975 | France |

*Primary Examiner*—Paul E. Konopka
*Attorney, Agent, or Firm*—Herbert Dubno

[57] ABSTRACT

Process for producing carbon molecular sieves for separating oxygen and nitrogen by treating a carbonaceous product with inert gas and steam in a vibrating oven and further treating said product with benzene at a high temperature in a vibrating oven to thereby narrow the existing pores.

2 Claims, 1 Drawing Sheet

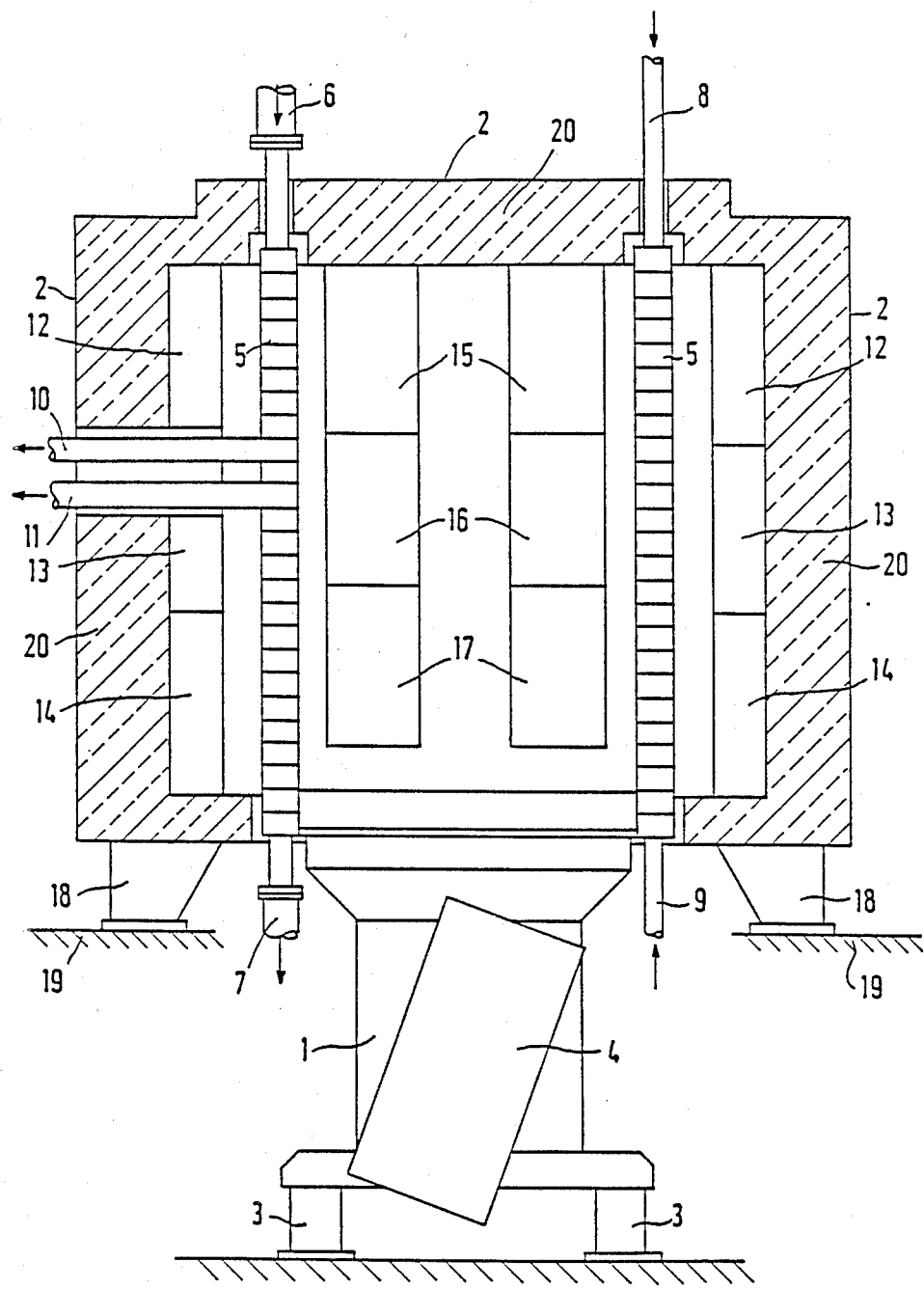

PROCESS FOR PRODUCING CARBON MOLECULAR SIEVES

The invention relates to a process for producing carbon molecular sieves in accordance with the introductory part of claim 1.

It is known from German Pat. No. 2 119 829 to produce carbon molecular sieves for the separation of small-molecule gases, particularly $O_2$ and $N_2$, by treating carbonization products with carbon-splitting hydrocarbons, which in the carbon structure of the carbonization product react by narrowing the already existing pores. Such carbon molecular sieves are produced in rotary kilns. The rotary kiln is indirectly heated and flushed with a nitrogen stream.

The rotary kiln has a relatively large volume with respect to the filling with carbon molecular sieves. This leads necessarily to the fact that large amounts of inert gas are required. During continuous operation, different dwelling periods result for the individual product particles (dwelling time spectrum). A deviation from the product quality results.

It is the object of the invention to create a process making possible the production of carbon molecular sieves with a uniform quality having very good separating characteristics.

According to the invention, this object is attained by passing the carbonization product through a vibrating oven at 800° C. to 900° C. for up to 30 minutes, whereinto a counterflow of inert gas with a steam concentration of 20 to 95% by volume is directed, and the so activated product is again passed through the vibrating oven at 750° C. to 850° C., with a counterflow of inert gas having a benzene vapor concentration of 12% by volume.

The production of the carbon molecular sieves can also be carried out in accordance with the claim 2, in two vibrating ovens, arranged in succession. This process has the advantage that the carbon molecular sieves can be produced in a continuous operation.

For the production of the carbon molecular sieves, a carbonization product is used which has been carbonized in a rotary kiln, in the conditions of an inert-gas atmosphere, at temperatures of 600° to 900° C. Due to the carbonization, cracking products have deposited in the pore system, causing an uneven narrowing, respectively a clogging of the pore system. In order to reverse this effect, according to the invention, the carbonization product is subjected to a light steam activation in a vibrating oven. In this activation, an activation degree of 3 to 6% is reached.

After the activation, in the vibrating oven a treatment with carbon-splitting hydrocarbons, such as benzene, takes place, in order to narrow the pores in a controlled manner.

The carbon molecular sieves produced this way satisfy the following quality test:

An adsorber vessel is filled with 200 ml carbon molecular sieves and an air stream is passed through it for one minute and than evacuated for another minute. After the dynamic balance is established (10 cycles) in the desorption phase a gas amount of 420–500 ml is desorbed and analyzed. The average oxygen concentration of the desorption gas ranges between 43–50% by volume of oxygen in the carbon molecular sieves produced according to the invention.

In the vibrating oven, the reaction space consists of a horizontally arranged channel with a rectangular cross section. This channel is set into oscillations by a vibrator or an eccentric. Due to these swinging motions, the individual carbon molecular sieve particles are transported through the channel.

An advantageous embodiment of the vibrating oven is a round kiln with overlying beds. Thereby, the solid material is guided through the oven in a circular path. At the transition points from one bed to the next underlying bed, the running surface is bevelled in such a manner that the particles, whether they are on the inside or the outside, all have the same dwelling time in each bed. The heating of the oven is done through electric multizone heating.

The heating elements are arranged around the oven like a heating shell and are arranged inside the oven in such a way that the reaction space is located in the focal point of the heat radiation. The suspension elements for the vibrating channel and the heating system are mechanically separated in such a way that the swinging motions can not be transferred to the heating elements.

By using the process of the invention, the following advantages result:

a/ The particles of solid material all have the same dwelling time in the reaction zone of the oven.

b/ Within the reaction zone, approximately the same temperature predominates.

c/ The oven has a very reduced dead space.

d/ The oven is so tight, that neither an intrusion of atmospheric oxygen nor an escape of noxious substances can take place.

e/ The consumption of buffer gas for inertization is very small.

f/ The energy requirements are relatively low, due to the compact construction and the good insulation possibilities.

g/ Since the reaction conditions can be very precisely kept constant during production, the quality of the final product is very good.

The invention will be described in detail with the aid of the drawing and the examples.

BRIEF DESCRIPTION OF THE DRAWING

The sole FIGURE shows a schematic representation of a vibrating oven suitable for carrying out the process of the invention, built as a round kiln with overlying beds.

From the drawing can be seen that the kiln with overlying beds consists of a swinging part 1 with swing pivots 3, with an oscillator 4, horizontally arranged beds 5, a material-supply device 6 and a material-discharge device 7, as well as ducts 8, 9, 10, and 11. The heating part 2 comprises a three-zone shell-heating 12, 13, 14, a three-zone intermediate heating 15, 16, 17 and an insulation layer 20.

The material to be treated falls through the material supply device 6 onto the running surface of the uppermost bed. The swinging part 1 is set into motion by the oscillator 4, so that the material passes through the individual beds with a uniform speed. Thereby, the path-length difference between the inner side and the outer side of the running surface is compensated by the fact that at the transition points from one bed to the next underlying bed, the end of the dumping edge is bevelled. The treated material leaves the oven through a discharge device 7. Through the duct 8, inert gas is supplied, which is passed through the oven in direct current with the carbon material to be treated. The reaction mixture (nitrogen with steam, resp. benzene) is fed into the oven through the duct 9, in counterflow. The gases leave the oven through ducts 10 and 11.

In the area of the heating zones 12 and 15, the material to be treated is directed with the inert gas in direct current and heated. In the area of the heating zones 13 and 14, 16 and 17, the reaction gas mixture is directed in counterflow. Due to this way to proceed, it is insured that only the heated material is contacted by the reaction gas. All the connections of the swinging part 1 are provided with corrugated tubes and oscillation dampers, not represented in the drawing.

The heating part 2 is mechanically separated from the swinging part 1 and rigidly connected to the base 19 by the suspension 18.

EXAMPLE

A carbonization product coming from the rotary kiln is heated in the upper part of a vibrating oven with overlying beds to a reaction temperature of 860° C. with nitrogen supplied in direct flow. In the reaction zone of the vibrating oven, nitrogen with a steam concentration of 35% by volume is fed in counterflow. The dwelling time in the reaction zone amounts to 15 minutes. An activation degree of 5% is reached. The resulting activated material is subjected to an aftertreatment with benzene in the vibrating oven. Thereby, a nitrogen-benzene mixture with 8% by volume is passed in counterflow through the vibrating oven at 800° C. The dwelling time equals 4 minutes. The characteristics of the carbonization product and of the resulted molecular-sieve coke are indicated in the table.

COMPARATIVE EXAMPLE 1

The carbonization product from the rotary kiln is treated with benzene in the rotary kiln at 800° C. The reaction temperature is 800° C. and the average dwelling time 25 minutes. A nitrogen flow with 3% by vol. benzene is passed in counterflow through the rotary oven. The characteristics of the resulted molecular sieve are indicated in the table.

COMPARATIVE EXAMPLE 2

The same carbonization product as in Example 1 and Comparative Example 1 is activated in the rotary kiln at a temperature of 810° C. The dwelling time equals 65 minutes and the reaction gas, which is fed in counterflow, contains 75% by vol. steam. The resulting activated product is treated in the rotary oven at 810° C. with a benzene-nitrogen mixture. The concentration of the benzene in the nitrogen is 6%, the dwelling time of the sieve material equals 16 minutes. The characteristics of the carbon molecular sieve is also indicated in the table.

From the example and the comparative examples, it can be seen that the characteristics of the carbon molecular sieve are improved by the controlled activation. The material produced in the vibrating oven has the best separating properties.

TABLE

| | Material after the carbonization in the rotary kiln (carbonization product) | Example Material after activation and aftertreatment in the vibrating oven | Comparative Example 1 Material after carbonization and aftertreatment with C6H6 in the rotary oven | Comparative Example 2 Material after activation and C6H6-treatment in the rotary oven |
|---|---|---|---|---|
| Weighed sample 200 ml adsorber (g) | 126.5 | 124.6 | 121.5 | 124.5 |
| desorbed gas amount (ml) | 635 | 450 | 450 | 450 |
| average $O_2$—concentration (% $O_2$) | 31.5 | 48.3 | 36 | 44.5 |

We claim:

1. Process for producing carbon molecular sieves for the separation of oxygen and nitrogen, wherein a carbonization product with a content of up to 5% by volume of volatile components is treated with carbon-splitting hydrocarbons which react in the carbon structure of the carbonization product with narrowing of the already existing pores, *characterized in that* the carbonization product is passed through a vibrating oven at 800° C. to 900° C. for 5 to 30 minutes, whereinto a stream of inert gas with a steam concentration of 20 to 95% by volume has been fed in counterflow to produce a slightly activated product and this slightly activated product is again passed through the vibrating oven, at 750° C. to 850° C., whereinto a stream of inert gas with a benzene vapor concentration of 5 to 12% by volume has been fed in counterflow to produce a carbon molecular sieve having narrower pores than said carbonization product.

2. Process for producing carbon molecular sieves for the separation of oxygen and nitrogen, wherein a carbonization product with a content of volatile components up to 5% is treated with carbon-splitting hydrocarbons, which react in the carbon structure of the carbonization product with narrowing of already existing pores, *characterized in that* the carbonization product is passed through a vibrating oven at 800° C. to 900° C. for 5 to 30 minutes, whereinto a stream of inert gas with a steam concentration of 20 to 95% by volume has been fed in counterflow to produce a slightly activated product and this slightly activated product is passed through a second vibrating oven at 750° C. to 850° C., whereinto a stream of inert gas with a benzene vapor concentration of 5 to 12% by volume has been fed in counterflow to produce a carbon molecular sieve having narrower pores than said carbonization product.

* * * * *